United States Patent Office 3,671,279
Patented June 20, 1972

3,671,279
PROCESS FOR THE CONTINUOUS XANTHATION AND SOLUTION OF ALKALI CELLULOSE
Koichi Yasui, Kazuo Yamamoto, Kazuo Itami, and Kiyoshi Fujisawa, Miyazaki-ken, and Toshio Sasaki, Osaka, Japan, assignors to Asahi Kasei Kogyo Kabushiki Kaisha, Osaka, Japan
Filed May 13, 1970, Ser. No. 36,825
Claims priority, application Japan, May 13, 1969, 44/36,337; July 17, 1969, 44/56,298
Int. Cl. C08b 21/20
U.S. Cl. 106—165                           20 Claims

ABSTRACT OF THE DISCLOSURE

This invention relates to a continuous process for xanthate-formation from alkali cellulose, carbon disulfide and aqueous alkali solution, as a preparatory step for the continuous manufacture of a ready-for-spinning viscose solution. This invention is characterized by that the alkali cellulose is precompressed, and added with aqueous alkali solution and carbon dioxide and the reaction mixture is kneaded in a series of two rotary type kneaders, in the first one of which only a presulfiding reaction is brought about and in the second kneader the remaining or main sulfiding reaction is carried out, the outlet from the second kneader being a dense paste having a soft cheese grade density comprising the xanthate as its main constituent.

BACKGROUND OF THE INVENTION

(1) Field of the invention

This invention relates generally to an improved process for the continuous manufacture of viscose; more specifically, it relates to a continuous process for xanthate-formation from alkali cellulose, carbon disulfide and aqueous alkali solution, as a preparatory step for the continuous manufacture of ready-for-spinning viscose solution, and an apparatus adapted for carrying out said process.

(2) Description of the prior art

Various proposals have been made for the continuous manufacture of alkali cellulose from cellulose pulp and aqueous alkali solution, and certain techniques of this kind have been practised on various industrial scales. On the other hand, a process for the continuous preparation of cellulose xanthate from alkali cellulose or crumbs and carbon disulfide by sulfiding or xanthation of the former has also been investigated with sincere efforts by those skilled in the art, but various problems inherent in this improved process have prevented it from its practice, at least not on an industrial scale.

In the conventional art, the preparation of xanthate is generally performed in batches by use of a wet or dry churn. In place of the churn, dissolver is also utilized for the same purpose and further for dissolving the xanthate. The interior or working space of this kind of machine must be kept in vacuum for avoiding otherwise possible explosive reaction of carbon disulfide with oxygen. This evacuation process is naturally troublesome and costly, and it should be mentioned that even with such troublesome processing mode the resulting xanthate is subjected to a considerable unevenness in its composition in the long run which will provide a rather inferior viscose for the optimum spinning thereof, even when neglecting a disadvantageously increased production cost and inferior textile nature of the final products manufactured therefrom.

A traditional proposal suggests for carrying out the desirous continuous sulfidation and dissolution of crumbs, while suppressing a possible dangerous explosion within the reacting vessel or fouling of ambient atmosphere with leaked disulfide, an emulsion system according to which aqueous alkali solution and carbon disulfide are mixed together in a specific ratio into an emulsion which is then brought into reaction with the alkali cellulose so as to provide dissolved xanthate. This improved process has suffered substantially from the formation of by-products, on the one hand, and from uneven mixing and reaction effect caused by virtue of the viscose operating conditions usually employed in this kind of process, on the other hand.

As a rescue for relieving the abovementioned drawbacks in the emulsion sulfiding process, it has been further proposed to admix a certain amount of activator such as conventional surfactant, mono-oil or the like to the reaction, mixture, especially for the realization of an even sulfiding reaction which resulted, however, in a considerable increase of the manufacturing cost, as well as still degraded nature of the reaction products and a comparatively low operating efficiency.

Such a process would be conceivable by those skilled in the art for realizing the continuous preparation of viscose at a high operational efficiency that the crumbs are continuously fed to a kneading machine having a rotatable and reciprocatable kneading rotor formed with a longitudinally interrupted spiral vane, said vane cooperating with a large number of kneading pins studded on the interior wall surface of a stationary coaxial housing mounting said rotor, while carbon disulfide is charged into the interior space of the kneader, so as to bring the alkali cellulose into reaction with carbon disulfide for providing the xanthate which is in this case in the form of easily collapsible flakes, the latter being then treated in a separate rotary machine with an aqueous alkali solution for dissolving the xanthate and providing a spinnable viscose.

According to our profound experiments on the last-mentioned process for the formation of xanthate, it has been found that a mechanical contact between the spiral vane and the stationary kneading pins is feared. When this should occur, sparks will be generated and an explosion of the dense mixture of carbon disulfide and air prevailing in the machine housing may be invited which means a dangerous industrial hazard and must be absolutely avoided. An inclusion of metallic foreign body such as a bolt in the material crumbs may result in the similar spark generation. In addition, considerable effort must be directed to the prevention of a possible leakage of carbon disulfide through various defective sealing means, because of the gaseous disulfide filled in the whole idle space in the kneading machine, as well as in the numerous small spaces formed in the flake-like processing material and the products of the similar structure. In addition, the gasified carbon disulfide will find its way to the open atmosphere from the interior of the machine housing reversedly through the inlet opening of the hopper for receiving the crumbs and through the interior space of the hopper.

For avoiding these drawbacks, especially for the cautionary prevention of explosion, it could conceive to charge an inert gas, such as carbon dioxide or nitrogen into the machine housing which measure is naturally highly cumbersome and costly.

The main object of the invention is to provide a process for the continuous preparation of viscose from alkali cellulose, carbon disulfide and aqueous alkali solution, while absolutely avoiding the aformentioned kind of explosive reaction of the disulfide with gaseous oxygen prevailing in a reactor adopted for the xanthate preparation purpose, and without specific charging of an inert gas for the suppression of the explosion.

It is a further object to provide a process of the above kind, capable of the realization of the xanthating reaction at a high operating efficiency with reduced cost, so as to provide, upon conventionally after-treated, a viscose of a highly improved nature in comparison with prior art.

SUMMARY OF THE INVENTION

For the realization of the aforementioned objects, the process according to this invention comprises, in combination, the following steps:

(1) A first step for pre-compressing continuously and mechanically alkali cellulose crumbs in advance of the initiation of an initial sulfiding reaction of the crumbs;

(2) A second step for supplying carbon disulfide and an aqueous alkali solution at least several volumetric ratios of the latter to the former and in a non-emulsified state to said compressed crumbs to such a degree that these crumbs are kept only in its wetted and solid state, for subjecting the crumbs to a combined action of swelling by alkali, sulfiding by carbon disulfide and dissolving partially by alkali;

(3) A third step for kneading the thus formed xanthate, non-reacted carbon disulfide, alkali solution and alkali cellulose completely together into a paste product, the sulfiding reaction being adjusted to its initial stage for consuming the supplied carbon disulfide less than 50%, preferably 30–40%;

(4) Said first to third steps being carried into effect in the interior of one and the same kneading machine; and (5) A fourth step for performing the remaining and main sulfiding reaction in a separate shearing type rotary kneader.

DESCRIPTION OF THE INVENTION

For mechanically compressing the alkali cellulose crumbs, a kneader having a rotatable and reciprocatable kneading rotor having a longitudinally interrupted spiral vane and a stationary housing mounting said rotor for allowing its rotation and reciprocation and formed on its inside wall surface with a large number of kneading pins arranged for cooperation with said vane for sufficient kneading at a proper synchronized timing for avoiding mechanical collision between said vane and said pins may be employed.

When the crumbs in their comparatively loose state are fed successively from a hopper, fixedly attached to said stationary housing and kept in communication through an inlet opening with the interior space of said housing, to the latter, and then subjected to compression in a compression zone formed in the housing or reaction vessel a substantial amount of free air contained in the whole fibrous structure of the crumbs is driven out therefrom and conveyed towards the hopper inlet in the reverse direction relative to the advancing direction of the introduced and compressingly processed crumbs so that the dangerous possibility of chemical contact of the air with the newly introduced liquid carbon disulfide is reduced so far. Inlet means for supply of liquid carbon disulfide and aqueous alkali solution are provided in the wall of the kneader housing and in proximity of the said inlet for the crumbs. This separating distance should be selected at three pitches of the vane spiral measured from the inner edge of the supply opening for the crumbs. The inlet means may be provided separately for the liquid reagents. Under circumstances, however, the inlet means may be one and the same inlet opening common to the both liquids, if these are united together directly before introduction into the kneader housing. When separately provided, the inlet openings for the both liquids must preferably be arranged only at a small mutual distance, so as to lead the liquids into contact with the compressed crumbs, the zone in which they are brought into contact with the liquids may thus be referred to as "crumb compressing zone," because the compression effect is observed at the highest in this zone. As will be seen from the foregoing, the both liquids do not constitute an emulsion, at least in this crumb compression zone and at the time of contact of the liquid reagents with the compressed crumbs, thus being absorbed within the body of the crumbs.

Supply ratio of the aqueous alkali solution relative to the carbon disulfide must be at least several times in volumetric figures, preferably 5–20 times, depending upon the concentration of the former and the desired nature of the viscous prepared from the xanthate. By adopting such large ratio of the alkali solution relative to the carbon disulfide, the latter liquid which is divided to a lesser or larger degree, depending upon the inflowing energy of the disulfide, and in advance of contact with the crumbs is enclosed substantially by the former liquid, thus a kind of liquid seals being provided to the divided carbon disulfide and thereby a chance for the evaporation of the latter being minimized and fear of chemical contact of the disulfide with the air prevailing within the crumb compression zone being reduced to substantial nil. In addition, the kneader housing is provided with cooling jackets through which a proper coolant such as cold water, brine or the like is recirculated and adjusted to cool the whole interior space of the housing so as to allow the sulfiding and kneading process which is a kind of exothermic one, to progress at 5–20° C. This lower value of the reaction temperature will contribute to reduce the possibility of evaporation of the carbon disulfide to a possible small value and prevent otherwise possible explosion hazard and disulfide leakage from taking place.

The feed quantities of carbon disulfide and aqueous alkali solution are adjusted to a possible minimum relative to the processing alkali cellulose crumbs and to such a degree that the crumbs are only wetted and remain in their solid state, as in the case that a blotting paper absorbs ink. Upon contact of the thus compressed and wetted crumbs with the both liquids, sooner or later, as the case may be, they are subjected to swelling by the liquid alkali, sulfiding by the liquid sulfide and dissolving of the thus formed xanthate in the liquid alkali, and kneaded as they conveyed towards a coaxial outlet of the kneader, thus the reaction and the dissolution being accelerated by being subjected to the mechanical kneading action provided by the vaned rotor cooperating with the stationary kneading pins.

The introduction of the liquid reagents in non-emulsified state and the chemical contact of them with the alkali cellulose crumbs are carried out in the second step. By keeping the liquid reagents in non-emulsified state at least at the commencement of said combined chemical and physical reactions, otherwise possible mutual by-reaction between the alkali and the disulfide can effectively be avoided, thus the reagents being utilized substantially exclusively in the sulfiding and dissolving reaction and the operational efficiency being thereby increased without inviting said fear of explosion. Thanks to the preparatory and mechanical compression of the crumbs, the liquid reagents may be absorbed therein almost instantly, so as to initiate the desired reaction. Separate air evacuation and inert gas introduction processes can be completely dispensed with.

In the third step performed in the interior space of the same kneader housing, the passage duration of the reaction mixture being so adjusted that only less than 50%, preferably 30–40%, of the carbon disulfide is consumed and the remaining or more than 50%, thus preferably 60–70% of the liquid disulfide relative to its initial supply quantity may be remained in non-reacted state. This remaining quantity amounting to larger than 50% of carbon disulfide is enclosed in its finely divided state in the body of the kneadedly prepared paste-like product comprising the non-reacted quantities of alkali cellulose and aqueous alkali solution and the formed xanthate in a highly concentrated emulsion.

The outlet paste from the third step is subjected to liquid-shearingly kneading action in a numerously repeated way within a separate kneader for performing the main sulfiding reaction accompanied by dissolution of the formed xanthate with alkali.

As is commonly known, the alkali cellulose comprises non-crystallized zones and crystallized zones and the former zones can be rather easily subjected to xanthation, while the latter zones are xanthated only with difficulty.

In the process according to this invention, the sulfiding reaction has been divided intentionally into the preparatory stage and the main stage and the former stage is carried into effect within a screw kneader operating with less mechanical shearing effect and a higher operating temperature, so as to perform the sulfiding reaction substantially of the non-crystallized zones of the alkali cellulose, while the latter stage is brought into effect in a shearing type kneader operating with larger liquid shearing effect and at a lower operating temperature, so as to perform the sulfiding reaction substantially of the crystallized zones of the alkali cellulose. The outlet product is also a paste xanthate containing a less amount of non-reacted cellulose.

By carrying out the main sulfiding reaction without addition of new alkali solution and under the above mentioned operating conditions, especially by subjecting the treating paste to substantially stronger shearing action, the crystalline structure of the non-reacted alkali cellulose is substantially loosened and destroyed for more easy access thereto by the carbon disulfide which is distributed in small liquid particles throughout the paste.

In the third stage, the paste xanthate is introduced into a shearing type kneader, preferably of the same structure as used in the second stage, with addition of a dilute aqueous alkali solution or plain water. In this way, the dissolution of the xanthate with the alkali solution or water into viscose can be performed under strong agitation with severe shearing force.

The apparatus adapted for carrying out the above process is characterized by that there are provided a first rotary kneader and a second rotary kneader connected in series one after another, said first kneader having a rotatingly and reciprocatingly kneading rotor for kneading alkali cellulose, liquid carbon disulfide and aqueous alkali solution for performing a pre-sulfiding reaction; and a concentrically arranged outlet for discharging a paste-like product, and said second kneader being of the shearing type having a rotatable and pinned rotor and adapted for performing the remaining or main sulfiding reaction by further kneading the paste-like presulfided product supplied from the first kneader to such paste-like state that the final product has a hardness of soft cheese.

The first kneader comprises a hollow cylindrical reaction vessel and a reducing cone-shaped hollow extension adapted for bearing a part of the reaction force transmitted through the kneading reaction mixture. For the same purpose, the piping connecting the outlet of the first kneader and the inlet of the second kneader may preferably be of the reducing type.

In addition, the reaction vessel must be fitted with a cooling jacket for effectively cooling the reacting and kneading mixture.

The guiding and driving means for the kneading rotor must be of the quick-push and slow-return type for carrying out the precompression of the alkali cellulose crumbs.

A machine adapted for carrying out the process according to this invention comprises a first kneader and a second kneader connected by a piping therewith, said first kneader having a kneading rotor rotatably and reciprocatably mounted; inlet for receiving alkali cellulose and inlet means for receiving carbon disulfide and alkali solution, said second kneader having a rotor fitted with kneading pins studded thereon and inside cooling means, for providing a pastelike xanthate from an outlet of said second kneader.

The machine may comprise in a more specific arrangement a first kneader comprising a stationary cylindrical reaction vessel; a cone shaped extension thereof made rigid and concentric therewith; a cantilever type rotor extending along the common axis of said vessel and said extention and mounted for performing a combined rotational and axially reciprocating movement, said rotor being formed with an axially interrupted spiral vane and said vessel comprising a number of kneading pins arranged in axial combs for cooperation with said spiral vane; a supply hopper attached to one end of said vessel opposite to said extension for receiving alkali cellulose crumbs and feeding the latter in metered quantity continuously into one end of the interior space of said vessel; inlet means formed on said vessel at a small axial distance from said hopper for receiving liquid carbon disulfide and alkali solution; and an axial outlet opening formed at the outer end of said extention, a second kneader comprising a stationary cylindrical reaction vessel; a hollow rotor mounted rotatably therein, the interior space of said rotor serving as a cooling chamber; a plurality of kneading pins attached to the outer cylindrical surface of said rotor; a plurality of kneading pins attached to the inside wall surface of said vessel for cooperating with said kneading pins on the rotor and inlet means formed on said vessel; a connection piping connecting said outlet with the last mentioned inlet.

The concentric provision of the outlet opening of the first kneader is very important in the practice of the invention, because a lateral provision thereof will lead to an uneven kneading effect of the formation of the paste, resulting in a low grade spinning viscose prepared from the paste. In addition, a local accumulation of the paste in close proximity to the outlet opening which will provide equally an adverse effect upon the viscose. The provision of the cone shaped extension of the main part of the reaction vessel of the first kneader will provide a throttling effect upon the axial flow through said cone extension. The provision of the connection piping between the first and the second kneaders serves for the similar throttling effect upon the outlet paste from the first kneader. This combined throttling effect will serve for providing a back pressure to the flowing paste. Without provision of such back pressure, the pre-compression of alkali cellulose crumbs in the crumb compression zone can not be attained. In practice, however, it is highly recommendable to provide a pumping means, such as a gear pump, in said connection piping. In this case, the pumping gears will serve as a kind of stop means for the delivered paste from the first kneader. This will assist effectively for increasing said back pressure enabling the crumb pre-compression.

These and further objects, features and advantages of the invention will become more apparent from the detailed description of an embodiment of the apparatus adapted for carrying out the process according to this invention and a preferred numerical example of the process. It should be, however, mentioned that the apparatus embodiment and a sole numerical example are given only for the illustrative purpose. Thus, many and considerable changes may be introduced within the meaning of the appended claims to be given.

In the following, a preferred embodiment adapted for carrying out the process according to the invention will be described in detail by reference to the accompanying drawings.

Figure 1:
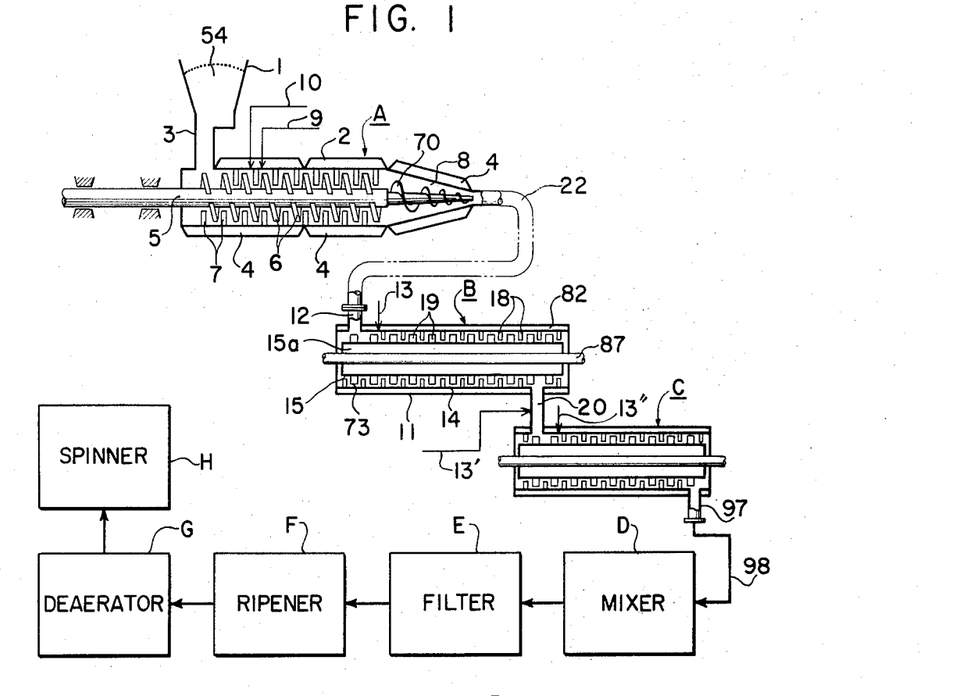
FIG. 1 is a schematic explanatory representation of a viscose manufacturing plant to the spinning stage, said plant, however, in addition to the first and the second kneaders, comprising a third kneader destined for the dissolving purpose of the paste-like xanthate as prepared by the inventive process.

In FIG. 1, A denotes a continuous presulfiding machine adapted for performing said first to third steps, together with partial dissolution of the produced xanthate with alkali. B denotes a continuous main sulfiding machine having its inlet connected with the outlet of said presulfiding machine A and adapted for performing said fourth step, together with partial dissolution of the produced xanthate with alkali. C denotes a continuous diluting and dissolving machine having its inlet connected with the outlet of said machine B and adapted for processing the xanthate with an alkali solution. Blocks D to H denote several after-treatment apparatuses for carrying out mixing, filtering, ripening, deaeration and spinning steps of the produced viscose.

Figure 2:
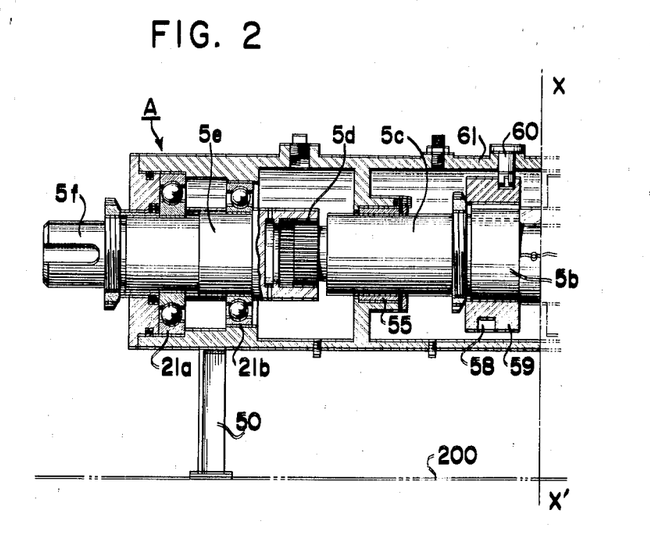
FIGS. 2–4 constitute in combination a single drawing showing a longitudinal section of the first kneader, the separating lines being shown at X–X' and Y–Y', respectively.
Figure 3:
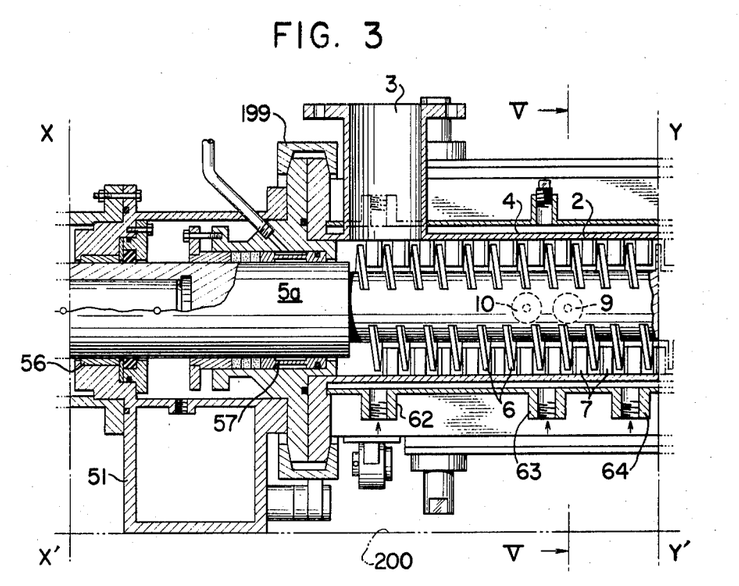
Figure 4:
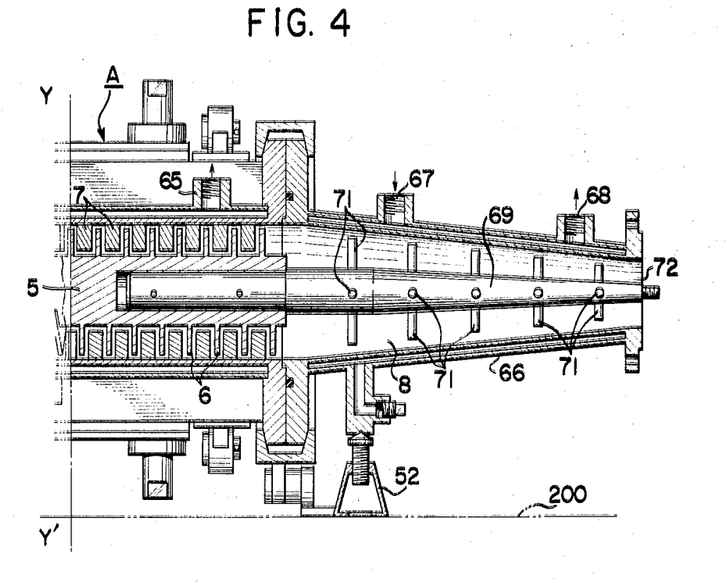
Figure 5:
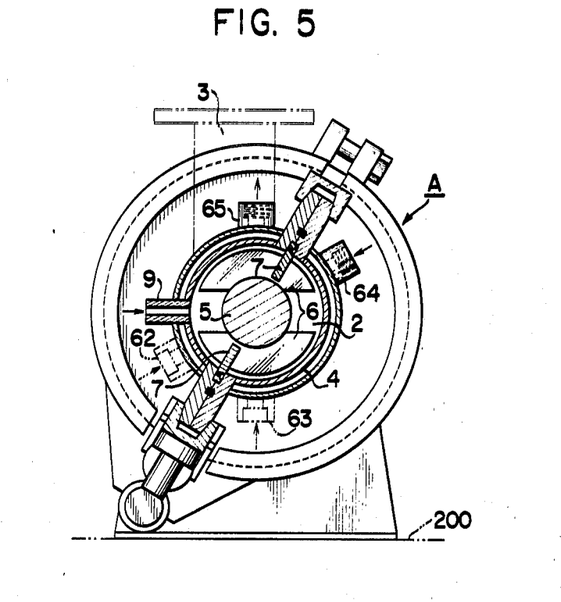
FIG. 5 is a cross-section of the first kneader along a section line IV—IV in FIG. 2.

The presulfiding machine A is shown more specifically in FIGS. 2–4.

In these figures, the numeral 1 denotes a supply hopper designed and arranged for receiving alkali cellulose from a certain supply source, not shown, and feeding it continuously to the machine A proper. The numeral 2 represents a reaction vessel shaped into substantially an elongated horizontal cylinder or drum and rigidly mounted by means of several supporting legs 50–52 on a floor represented simply by a chain-dotted line 200.

The alkali cellulose 54 is supplied from the hopper, through a supply duct 3 to the reaction vessel 2 either by gravity or through a powered delivery means, not shown, and in a metered way as known per se.

The reaction vessel 2 is fitted with a jacket 4 through which a proper cooling medium, preferably cold water or cooling brine, may be passed for recirculation for the control of the inside temperature of the vessel.

The numeral 5 denotes a rotor fitted with a longitudinally interrupted spiral vane and mounted rotatably in the reaction vessel 2 at a relatively slow speed such as 20 r.p.m.

The rotor 5 has an extension comprising several elements 5a–5f, said extension being mounted in antifriction bearings 21a and 21b, as well as bearing and shaft sealing means 55–57. As seen, the rotor proper 5 together with a reduced extension 69 extends along the whole length of the axis of said vessel 2 in the form of a cantilever.

Two longitudinal rows of kneading pins 7 arranged in the shape of combs are fixedly attached on the inner wall surface of the reaction vessel 2, said pins are adapted for cooperation with the interrupted spiral vane 6 which is arranged to perform an axial reciprocating movement per its complete revolution. But, the relative ratio above specified of the rotor reciprocations to the revolutions thereof is non-limitative for the invention. For instance, two reciprocations per rotor may be realized by increasing the number of vane interruptions when seen in the longitudinal direction of the rotor. Naturally, in this case, the guiding cam means to be described must be properly modified.

As seen especially from FIG. 1, the right-hand end portion of reaction vessel 2 is opened axially and connected through its outlet part 8 of a gradually throttling design and a connection piping 22 to the second stage or main sulfiding machine 11. The piping 22 may preferably be fitted with a feeding pump, preferably gear pump, although not specifically shown.

In a modified arrangement not shown, the rotor 5 extends substantially through the outlet part 8 and this rotor extension may be provided with a spiral vane, for delivery of the product, cellulose xanthate in a paste-like state at a higher pressure than otherwise.

An arrow attached with the numeral 9 denotes schematically a supply inlet for introducing liquid carbon disulfide into the vessel 2; and that attached with numeral 10 denotes a supply inlet for an aqueous alkali solution for the similar purpose.

Figure 8:
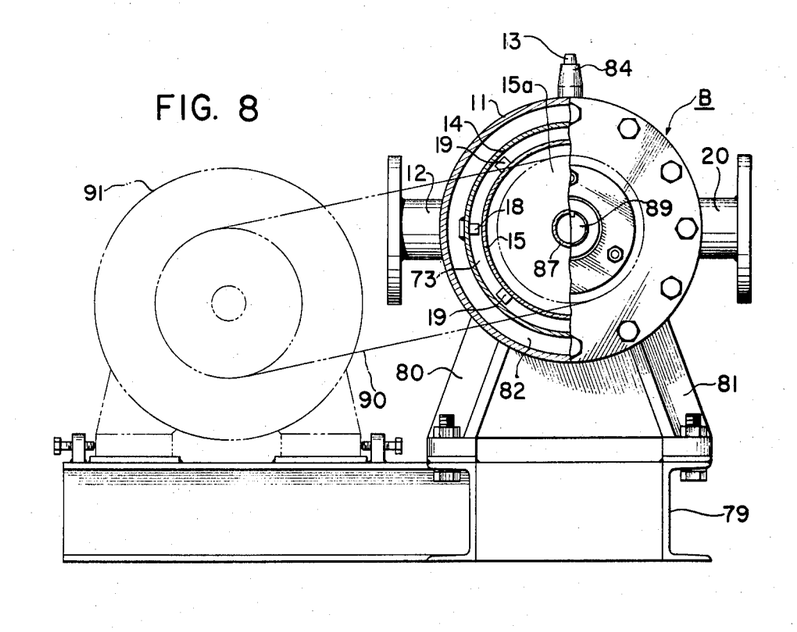
FIG. 8 is an end view, partially being sectioned, of the second kneader.

The outer end, 5f, of the rotor extension is arranged to receive drive torque from an electric motor through a reduction gearing and a belt drive substantially in the similar way shown in FIG. 8 for the second stage machine B, although not specifically shown and described, the rotational speed of the rotor assembly being selected, for instance, to be 16–20 r.p.m.

At an intermediate portion 5b of the rotor extension, as seen in FIG. 2, a cylindrical cam 59 having a closed cam groove 58 is keyed to, said cam groove being so shape that the rotor is pushed rightwards in a relatively sudden pull and returns relatively gradually. Since such movement of the kneading rotor and the necessary cam groove for attaining this effect are very popular so that the detailed cam configuration has been omitted from the drawing. The cam groove 58 is kept in slidable contact with a guide pin 60 stationarily attached on the inside wall of an end casing 61 which is rigidly connected at 199, FIG. 2, with the left-hand flanged and open end of the reaction vessel 2.

Jacket 4 is provided in its main part with coolant inlets 62–64 and an outlet 65 for cooling the reaction mixture within the interior of the reactor 2.

The tail part of the jacket 4 is shown specifically at 66 in FIG. 4; this jacket part is provided with coolant inlet 67 and outlet 68 for effectively cooling the kneaded reaction mixture. Within this outlet zone 8, the rotor 5 is provided concentrically with a rotor extension 68 which is fitted with several separated groups of kneading and feeding pins 71 radially and equidistantly arranged on the rotor extension. As was hinted in the foregoing, these pins 71 can be replaced by a continuous spiral vane, as shown at 70 in FIG. 1 in a highly simplified way.

In the operation of the aforementioned first stage machine A, the rotor 5 is rotated and reciprocated. Alkali cellulose 54 is supplied from hopper 1 through supply inlet duct 3 in metered quantities into the interior space of the reaction vessel 2 and at its left-hand end part.

At the same time, carbon disulfide and aqueous alkali solution are supplied into the reaction vessel through respective inlets 9 and 10, although in FIG. 1 these inlets have been only schematically shown only for simplicity. The position of these inlets 9 and 10 can be replaced by each other, when necessary.

The supplied alkali cellulose substantially in the form of crumbs is gradually compressed as being fed rightwards by the rotating and reciprocating rotor vane 6 until it arrives at the compression area which is substantially defined in its width by the positions of these inlets 9 and 10. The inlet 10 defines substantially the beginning area of the precompression zone and the inlet 9 defines substantially the end area of said zone when seen longitudinally of the reaction vessel.

To the thus precompressed crumbs, liquid carbon disulfied and aqueous alkali solution are fed through these inlets 10 and 9, respectively. The supplied quantities of these liquid reagents are so selected that the crumbs absorb them, but they keep their solid state at least at the moment of contact with the liquids. This phenomenon can be easily imagined of when observing a blotting paper absorbs ink droplets.

By contact of the crumbs in solid state with relatively small amounts of the liquid reagents, they are brought into their wetted state only. Therefore, the original state of the crumbs is substantially same as supplied.

The thus mechanically precompressed and wetted crumbs initiate to react with the liquid reagents directly upon contact with them and progress the presulfiding reaction while being heavily kneaded by the rotating and reciprocating rotor vane 6 cooperating with the kneading pins 7.

The axial least distance between the inner edge of the inlet passage 3 and beginning area of the compression zone may preferably amount, when expressed in terms of spiral pitches of the kneading vane 6, to 3.

In the above-mentioned mechanical and chemical way, a highly thick paste substantially containing cellulose xanthate dissolved in the aqueous alkali solution is obtained. Or more specifically the thus formed paste comprises the xanthate, nonreacted carbon disulfide, alkali solution and alkali cellulose. By adjusting the feed rates of the both liquid reagents and the mechanical kneading effect, the presulfiding reaction is so adjusted to consume the supplied carbon disulfide less than 50%, preferably 30–40%, when measured at the outlet opening at 72 (FIG. 4).

The paste substantially prepared in the main part of the reaction vessel is then conveyed, further kneaded and pressurized in the outlet zone 8 to be subjected to the action of the feed pins 71 or the feed vane 70 on the rotor extension 69 and finally discharged through the outlet 72 and piping 22 to the second kneader B.

As seen especially from FIG. 2, the outlet 72 is opened concentrically with the reactor per se 2 and also with its extension 8.

The cantilever suspension of the rotor assembly 5 and 69 is of great importance for carrying out the invention, because a provision of additional bearings within the reactor proper or its extension will provide a substantially hindrance to the substantially symmetrical flow of the reaction products around the axis of the reactor assembly. Even slightest, a deflection from the symmetrical material flow within the reactor assembly will invite disadvantageous unevenness in the nature of the paste mixture delivered from the assembly, which results in a substantial fluctuation of the viscose in its nature, as well as that of the quality of the spun products.

The concentric provision of the outlet opening 72 in the first kneader serves well for the above same purpose. A radial provision of the outlet opening in the first kneader will invite unacceptable unevenness of the processed fibrous products spun from the viscose prepared from the cellulose xanthate processed from the pre-sulfide paste product.

Figure 9:
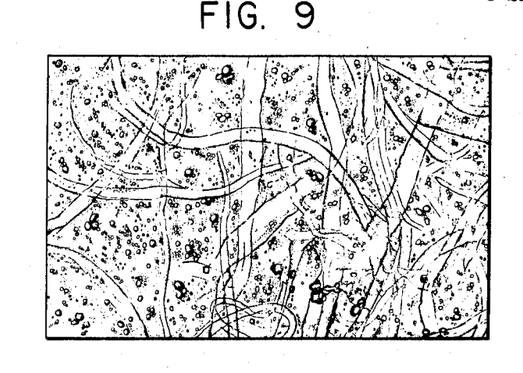
FIGS. 9, 10 and 11 are reproductions of microphotographs of the products from the first, the second and the third kneader.

A micro-photograph of the paste-like product delivered from the first kneader A is shown in FIG. 9, as will be described more in detail hereinafter.

Figure 6:
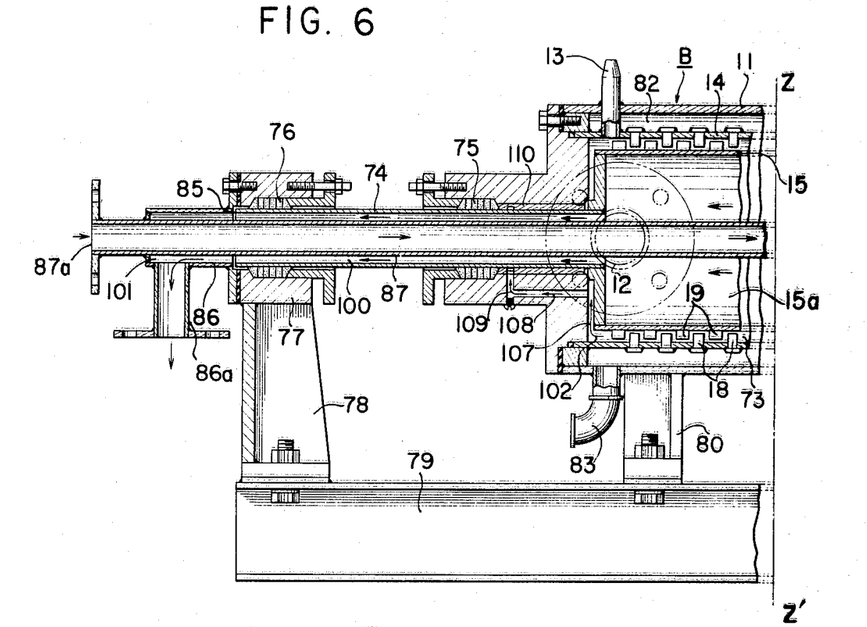
FIGS. 6 and 7 constitute in combination a single drawing illustrative of a longitudinal section of a second kneader, the separating line being shown at Z–Z'.

In FIGS. 1 and 6, the numeral 12 denotes an inlet provided on the second kneader B for receiving the paste-like pre-sulfided and dissolved product from the first kneader A. 13 denotes an auxilary inlet for receiving fresh water or aqueous alkali solution. But, in the case of the second kneader B, this inlet 13 is normally closed. This kneader B comprises an outer drum 11 and an inner drum 14 rigidly connected with each other, so as to form a cooling jacket space 82 therebetween. A number of kneading pins 18 are fixedly attached to the inner drum 14 so as to project into the interior space thereof. These pins 18 are radially and longitudinally in rows, or more specifically in a matrix when developed on a plane.

A rotor drum 15 is concentrically and rotatably mounted within the interior space of the stationary inner drum 14 and provided on its outer surface with a large number of kneading pins 19 arranged again in a matrix when developed on a plane, and in a zigzag way for cooperating with the stationary pins 18 so as to provide considerable liquid shearing effect upon the treating paste material and to accelerate the remaining or main sulfiding reaction. The radial distance between the inner drum 14 and the rotor drum 15 is rather small, so as to form a ring-shaped working or reaction space 73 of a rather thin radial width.

Along the central axis of the rotor drum, there is provided an elongated, rotatable hollow shaft 74 rigidly attached thereto and extending leftwards in FIG. 6, said shaft being effectively sealed at 75 and 76 and mounted in a bearing structure 77. This structure 77 is supported through a pedestal 78 on a base 79 which mounts rigidly said outer drum 14 through pedestals 80 and 81. The cooling jacket 82 is provided with coolant inlet 83 and outlet 84.

The outer extremity of the rotatable hollow shaft 74 is in close proximity to the inner end of a stationary tubing 86 through a small idle gap 85, said tubing being arranged concentrically with and as an extension of the shaft 74, although said tubing is rigidly mounted. This tubing 96 is rigidly connected with a coolant-discharge socket 86a.

An elongated stationary central pipe 87 is concentrically arranged and formed at its outer end with a coolant inlet end 87a. This pipe 87 is rigidly connected, as by welding, to the stationary tubing 86 which serves naturally as a coolant discharging pipe. This pipe 87 extends along the common central axis of the rotatable shaft 74 and the inner drum 15 till the open end 87a, FIG. 7, which is separated through a small gap from a hollow drive shaft 88.

The outer end of the hollow shaft 88 is rigidly connected with a drive shaft 89 which is adapted for being driven from outside through a proper motion transmitting means 90 such as belt, chain or the like, shown only schematically by a chain-dotted line in FIG. 8, by a conventional prime mover such as an electric motor 91 fitted with a reduction gearing, not shown, at 100 r.p.m., as an example. The interior space of the hollow shaft 88 constitutes a liquid chamber containing water.

Figure 7:
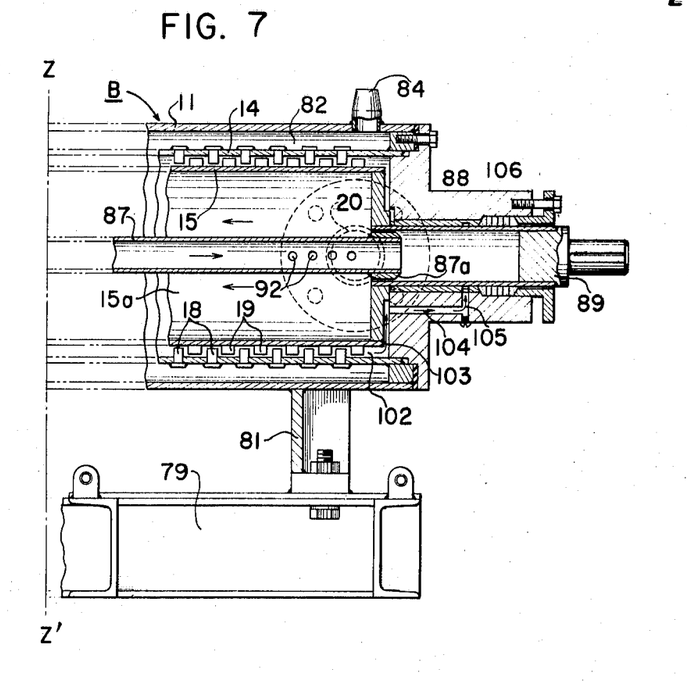

In proximity to the righthand end, FIG. 7, of the central pipe 87, the latter is formed with several perforations 92 for supplying water coolant to the interior space of rotor drum 15 for effectively cooling the working or kneading space from inside through the wall of the rotor drum.

In the operation of the machine, a main switch, not shown, is closed so as to feed the drive motor 91 with current through a connection wiring, not shown, from a power source, not shown, for starting said motor. Motion is therefore transmitted from the motor 91 through the transmission means 90 to drive shaft 89, thence through hollow shaft 88 to drum rotor 15.

Coolant, such as fresh water at 10° C. as an example, is fed from a certain supply source, not shown, to the central pipe 87 through its inlet end 87a, thence through the interior space of the latter and the coolant passage openings 92 into the interior space 15a of drum rotor 15 for performing the cooling. The coolant water then leaves the drum space 15a through an elongated ring space 100 defined between the wall of rotating hollow shaft 74 and the stationary central pipe 87, and through a ring space 101 as an extension of said space 100, and finally discharged through the discharge outlet 86 to outside of the machine.

At the same time, coolant water is supplied from inlet 83 to the outer jacket 82, the ring-shaped working space 102 formed between the outer drum 11 and inner drum 14 is cooled from its outside. Then, the coolant is discharged from outlet 84 to outside of the machine.

Paste product comprising pre-sulfided cellulose is fed from the first kneader A to the second kneader B through its inlet 12 to the working or kneading space 102 for performing the remaining or main sulfiding reaction while being subjected to severe and repeated pin-to-pin liquid shearing action provided by the relatively moving pins 18 and 19.

Figure 10:
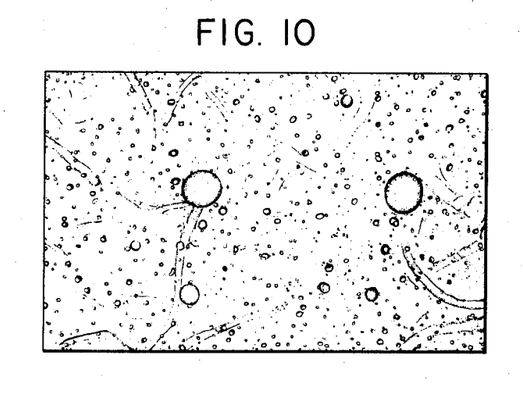

The thus prepared paste has a soft cheese-like viscosity, as was hinted hereinbefore. In FIG. 10, a microscopic photograph of the outlet product from the second kneader B is shown by a manual reproduction thereof, as will be described hereinafter in a more detailed way.

This outlet product is conveyed through a connection piping 20 to the working or kneading space of the third rotary kneader C which is of the similar design to that of the second kneader. Therefore, the detailed description thereof may be dispensed with for better understanding of the invention. It should be, however, noted that the third kneader acts as a dissolver and therefore the treating material is diluted in the kneader with addition of fresh water or aqueous alkali solution. For this purpose, as inlet means such as shown at 13' or 13" having a similar design such as at 13 shown in FIG. 1 or 6 may be utilized. In this way, a viscose having a spinnable viscosity can be prepared and delivered from an outlet 97 through a piping 98, only schematically represented in FIG. 1 to conventional mixer D shown schematically only by a block.

A part of the diluted viscose is led through several narrow passages 103, 104 and 105 in succession, as shown in FIG. 7, for performing effective lubrication of the relatively sliding surfaces formed on the hollow drive shaft 88 and its bearing sleeve 106 provided at the outlet end of the third kneader, as exemplifiedly shown. But, it should be noted that this kind of lubrication can not be adopted in the case of the second kneader.

As exemplified in FIG. 6, and only in the case of the third kneader C, it is fitted at its inlet end with a similar lubrication means. More specifically, a part of the diluted viscose is fed from the working space 73 through successive narrow pasages 107, 108 and 109 to the relatively sliding surfaces of the rotating hollow shaft 74 and its bearing sleeve 110.

According to our practical knowledge, the main sulfiding reaction must be carried into effect under rather intensified cooling for avoiding otherwise possible formation of disadvantageous by-products, while the pre-sulfiding reaction must be realized with careful caution for providing an even kneading effect and practically without any fear of checking of the material flow within the reactor. The division of the sulfiding reactor into a first kneader serving as the pre-sulfiding reactor and a second kneader serving as the main sulfiding reactor, as proposed by the present invention, is highly effective for the practice of the cellulose xanthation. According to our practice, this procedure is highly efficient for the continuous manufacture of high quality viscose. Occurence of material flow checking in the pre-sulfiding stage will invite formation of locally accumulated cakes which, when happended to take place, leads to, so to speak, a substantial later contamination of the prepared viscose and thus to considerable fluctuation of the nature and properties of the spinnable viscose. By processing the pre-sulfiding mixture in a separate pre-sulfiding and kneading reaction vessel of the kind referred to, the above-mentioned technical difficulty can effectively be solved out.

According to this invention, the main sulfiding reaction is carried out in a second kneader having an elongated ring-shaped working space of a rather small radial width, so as to subject the pre-sulfided paste product to the main sulfiding reaction by kneading the reaction mixture in a pin-to-pin type liquid shearing way under sufficiently cooled condition from outside as well as inside of the working space, because the main sulfiding reaction progresses rather in a considerable exothermic way. Material flow checking is effectively avoided also in the present second processing stage.

The paste-like xanthate delivered from the outlet of the second kneader has a viscosity of soft cheese grade, as was already referred to, and must be subjected to a third kneader substantially of the same type as of the second kneader, except that in the present kneader an inlet is provided for the diluting fresh water or aqueous alkali solution. In this stage, an even kneading by the adoption of said kind of liquid shearing and an effective cooling from both sides of the working chamber of the third kneader acting as dissolver are utilized for diluting the soft cheese grade viscose into a spinnable one.

The reason why the mechanical combination of the spiral vane rotor with the stationary kneading pins is employed in the pre-sulfiding kneader is such that without use of such combination and thus with use of a spiral vane rotor only, as an example, part of the kneading material is liable to remain on the bottom of the spiral groove and an even kneading will be considerably injured.

For carrying out the main sulfiding reaction, the remaining or non-reacted non-crystalline parts of the alkali cellulose must firstly be swollen for allowing easy access of the alkali. For this purpose, a more efficient cooling must be performed. The employment of the inside cooled kneading rotor meets well with this requirement.

The adoption of the severe pin-to-pin liquid shearing action upon the processing mixture containing non-reacted crystalline parts of the alkali cellulose in the main sulfiding reaction stage carried out within the second kneader will considerably contribute to mechanical destruction of the cellulose for easy access to the alkali and disulfide. Similar phenomenon is observed in the course of the dissolving stage in the third kneader.

According to our experimental knowledge, the smooth and efficient spinning of viscose into continuous filaments without inviting substantially any trouble such as clogging of spinning orifices, fluff formation on the spun filaments and filament breakage during the extruding and coagulating period can be positively assured with use of such viscose that it should contain at least 9 wt. percent of overall alkali, provided tha the viscose is prepared from alkali cellulose, carbon disulfide and aqueous alkali solution as the starting materials. In order to satisfy this requirement, the viscose must naturally contain again at least 9 wt. percent of cellulose.

With the higher content of the overall alkali, the more favorable will become the smooth and efficient spinnability of the spinning viscose in the above sense. Thus, when it is aimed to increase the overall content of alkali contained in the conventional viscose, the content of the cellulose must be correspondingly increased which leads, however, to an increase of the viscosity of the viscose in its broadest meaning and the viscosity thereof will attain such a value as owned by the soft cheese.

It should be mentioned that the term "soft cheese like" as used herein throughout the present specification is meant by such viscosity range amounting from about 5,000 to 50,000 poises.

The present invention provides a unique technique for the preparation of such highly condensed, soft cheese like viscose. For the practical use of this kind of condensed viscose for the practical spinning, it must be diluted with water or aqueous alkali solution to a certain predetermined concentration of 75 poises as an example.

In the following, several preferred numerical examples will be given by way of example, for better understanding of the invention. In these examples, the used test plant was that which has been disclosed in the foregoing with reference to the accompanying drawings.

EXAMPLE 1

Alkali cellulose crumbs, made from wood pulp by the conventional slurry steeping process and having, after aging, such composition as cellulose content: 32.5%; total alkali content: 15.5% and mean polymerization degree: 340, was fed continuously at a feed rate of 13.75 kgs. per hour through the supply opening 3 into the interior space of the reaction vessel of a first kneader 1. At the same time, liquid carbon disulfide and an aqueous alkali solution were fed respectively through supply inlets 10 and 9 at 1.30 kgs. and 11.35 kgs. per hour, respectively.

The alkali solution had a concentration of 8.26 wt. percent. The rotor 5 was driven continuously at 16 r.p.m.

The brief specification of this first kneader was as follows:

| | Mm. |
|---|---|
| O.D. of reaction vessel including cooling jackets | 220 |
| I.D. of reaction vessel | 150 |
| Overall length of reaction vessel material inlet, compression zone, reaction space and cone extension | 1,020 |
| Distance from inner edge of material inlet to inlet 10 | 156 |
| Distance between inlets 9 and 10 | 17 |
| O.D. of spiral vane | 144 |
| O.D. of rotor proper | 80 |
| Pitch of spiral | 26.5 |
| Number of pitches: 20 | |
| I.D. of reduced end of cone extension | 80 |

The introduced alkali cellulose crumbs were gradually compressed during being conveyed by the revolving rotor vane along a distance corresponding to five pitches of the rotor vane. It was assumed that the compression degree amounted to about 3–6. After being conveyed to the crumb compression zone extending normally along about 1–3 pitches of the vane wherein said both inlets 9 and 10 were positioned, the crumbs were brought into naturally contact with said both liquid reagents and the xanthation of the alkali cellulose and the dissolution of the formed xanthate were initiated. Then, the alkali cellulose was further conveyed towards the concentric outlet opening and subjected to the xanthation. The processing period counted from the introduction of the crumbs into the first kneader to the delivery of a paste-like product amounted to about 13 minutes and the reaction temperature was kept at 10° C. (which may be varied within a range between 5–20° C.). A microscopic photograph of the outlet paste was reproduced manually at FIG. 9.

In this figure, several band-like strips are seen which consist of non-reacted alkali cellulose of crystalline parts. The non-crystalline or amorphous parts thereof have been swollen, sulfided and dissolved away upon contact with alkali and carbon disulfide, and into a paste which is seen as the white background of this figure. Small bubbles consist mainly of non-reacted carbon disulfide, but including further a small quantity of the entrained air. Exact discrimination of the latter from the former is impossible when relying only upon the microscopic observation.

The specification of the outlet paste from the first kneader was as follows:

| | |
|---|---|
| Viscosity | Soft cheese like. |
| Color | Light yellow. |
| Cellulose content | 16.30%. |
| Overall alkali content | 11.50%. |
| Gamma value | 20.0. |
| Consumed carbon disulfide | 38.0%. |

This outlet paste was then conveyed through a 2-inch connection piping to a second kneader B for being subjected to appreciable liquid shearing effect in a numerously repeated way by cooperation between two groups of kneading pins 18 and 19.

A brief specification of this second kneader was as follows:

| | | |
|---|---|---|
| Overall O.D. of shell | mm | 267.4 |
| I.D. of shell | mm | 204.7 |
| Length of shell | mm | 1,500 |
| O.D. of rotor | mm | 180 |
| Arrangement of kneading pins on stationary drum | | 2×44 |
| Arrangement of pins or rotor | | 4×45 |
| Revolutions of rotor | r.p.m | 10–20 |
| Treating capacity | kgs./hr | 15–35 |
| Treating temp. range | ° C | 3–15 |
| Kind of coolant and cooling temp. | | (1) |

[1] Cold water at 4–6° C. or brine from −15° C. to −5° C.

The outlet paste product subjected to the main sulfiding reaction for 37 minutes by the continued kneading under liquid shearing action in the second kneader is shown in FIG. 10 by way of example and again the form of a microscopic photograph manually reproduced.

As seen, the quantity of the non-reacted alkali cellulose has been considerably reduced. The same is applied to the non-reacted quantity of carbon disulfide. Several larger particles seen consist naturally of entrained air.

The paste xanthate thus prepared was then conveyed together with an added quantity of plain water at a feed rate of 25.1 kgs. per hour, to the third kneader, the specification of which was same as that of the foregoing second kneader. The processing period at this stage amounted to 23 minutes. Productive output amounted to 52.5 kgs./hr.

The specification of the thous obtained viscose was as follows:

| | |
|---|---|
| Viscosity | 73 seconds as measured by falling ball method. |
| Color | Same as conventional viscose. |
| Cellulose content | 8.5%. |
| Overall alkali cont. | 6.0%. |
| Gamma value | 53. |
| KW-value | 93. |

The viscose was further processed by several conventional after-treatment steps of filtering, ripening and de-aeration and the refined viscose was then subjected to a conventional spinning process, so as to produce a rayon yarn, 26 fils, 120 d. After scouring and drying, the yarn showed the following excellent properties as shown in the following Table 1 in which, comparative results are also shown for comparison.

TABLE 1

| | Inventive | Conventional |
|---|---|---|
| Denier | 119.8 | 119.9 |
| Dry strength, g/d | 1.89 | 1.82 |
| Dry elongation, percent | 19.8 | 20.1 |
| Wet strength, g./d | 0.93 | 0.85 |
| Wet elongation, percent | 28.7 | 29.0 |

EXAMPLE 2

In the present example, the processing procedures were substantially as before, except of the following processing data:

| | | |
|---|---|---|
| Feed rate of alkali cellulose | kgs./hr | 12.50 |
| Feed rate of alkali solution | kgs./hr | 18.05 |
| Concentration | wt. percent | 5.15 |
| Feed rate of carbon disulfide | kgs./hr | 1.35 |
| Pre-sulfiding temp. | ° C | 15 |
| Revolutions of rotor of first kneader | r.p.m | 20 |
| Kneading period in first kneader | minutes | 15 |
| Main sulfiding temp. | ° C | 13 |
| Revolutions of rotor of second kneader | r.p.m | 20 |
| Kneading period in second kneader | minutes | 45 |
| Dissolving temp. in third kneader | ° C | 8 |
| Revolutions of rotor of third kneader | r.p.m | 50 |
| Processing period in third kneader | minutes | 21 |
| Feed rate of diluting water | kgs./hr | 15.85 |

Specification of the output from the first kneader:

| | |
|---|---|
| Viscosity | Soft cheese like. |
| Color | Light yellow. |
| Cel. content | 13.75%. |
| Overl. alk. cont. | 9.0%. |
| Gamma val. | 19.2. |
| Consumed carbon disulfide | 35%. |

Specification and del. rate of the output from the second kneader:

| | |
|---|---|
| Vis. | Soft cheese like. |
| Color | Slightly reddish yellow. |
| Cel. content | 13.75%. |
| Overl. alk. cont. | 9.0%. |
| Gamma val. | 51. |
| Cons. car. disulfide | 90%. |

Specification of viscose:

| | | |
|---|---|---|
| Viscosity | seconds | 68 |
| Color | | (1) |
| Cel. content | percent | 8.50 |
| Overl. alk. cont. | do | 6.0 |
| Gamma value | | 55 |
| KW-value | | 104 |
| Del. rate | kgs./hr | 47.75 |

[1] As conventional.

Specification of spun yarn (see Table 2).

TABLE 2

| | |
|---|---|
| Denier | 120.1 |
| Dry str., gr./d. | 1.90 |
| Dry elong., percent | 19.7 |
| Wet str., gr./d. | 0.94 |
| Wet elong., percent | 28.5 |

EXAMPLE 3

In the present example, the processing procedures were substantially as before, except of the following processing data: The viscose was highly suitable for the preparation of polynosic filaments.

| | | |
|---|---|---|
| Feed rate of alkali cellulose | kgs./hr | 13.76 |
| Feed rate of alkali solution | kgs./hr | 14.13 |
| Concentration | wt. percent | 6.2 |
| Feed rate of carbon disulfide | kgs./hr | 2.11 |
| Pre-sulfiding temp. | °C | 20 |
| Revolutions of rotor of first kneader | r.p.m | 20 |
| Kneading period in first kneader | minutes | 15 |
| Main sulfiding temp. | °C | 15 |
| Revolutions of rotor of second kneader | r.p.m | 20 |
| Kneading period in second kneader | minutes | 40 |
| Dissolving temp. in third kneader | °C | 10 |
| Revolutions of rotor of third kneader | r.p.m | 70 |
| Processing period in third kneader | minutes | 20 |
| Feed rate of diluting water | kgs./hr | 45.0 |

Specification of the output from the first kneader:

| | |
|---|---|
| Viscosity | Soft cheese like. |
| Color | Light yellow. |
| Cel. content | 15.0%. |
| Overl. alk. cont. | 10.0%. |
| Gamma val. | 32.8%. |
| Consumed carbon disulfide | 40.0%. |

Specification and del. rate of the output from the second kneader:

| | |
|---|---|
| Vis. | Soft cheese like. |
| Color | Slightly reddish yellow. |
| Cel. content | 15.0%. |
| Overl. alk. cont. | 10.0%. |
| Gamma val. | 72. |
| Cons. car. disulfide | 88%. |

Specification of viscose:

| | | |
|---|---|---|
| Viscosity | | 680 |
| Color | | (1) |
| Cel. content | percent | 6.01 |
| Overl. alk. cont. | do | 4.0 |
| KW-value | | 147 |
| Gamma value | | 82 |
| Del. rate | kgs./hr | 75.0 |

[1] As conventional viscose used for polynosic filaments.

Specification of spun yarn (see Table 3).

TABLE 3

| | Inventive | Conventional |
|---|---|---|
| Denier | 74.9 | 75.0 |
| Dry strength | 4.1 | 4.0 |
| Dry elongation, percent | 7.0 | 7.1 |
| Wet strength, g./d | 3.0 | 2.8 |
| Wet elongation, percent | 7.5 | 7.7 |

Although in the foregoing the description has been directed to the manufacturing technique of viscose adapted for use in the preparation of spun filaments, it would be clear that the viscose prepared in accordance with the novel teaching of the invention can be used in other various purposes, such as, by way of example, for the manufacture of cellophane and the like.

Figure 11:
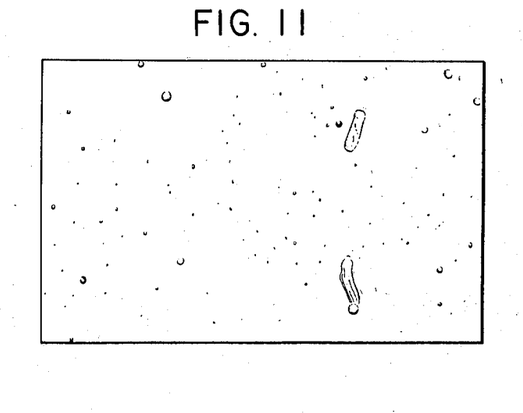

In FIG. 11, a microscopic photograph of the viscose having a spinnable viscosity and delivered from the third rotary kneader is shown by manually reproducing the same. It will be seen from this figure that non-reacted residual of alkali cellulose is very small in its quantity which means that almost all of the charged alkali cellulose has been sulfided and dissolved. Residual bubbles of non-reacted carbon disulfide and entrained air have also been reduced to a possible minimum. In addition, it should be mentioned that these disadvantageous residuals can easily be removed during processing through the following several after-treatment stages as schematically shown at D–G in FIG. 1. In this way, a satisfactory spinnable viscose can effectively be prepared.

The embodiments of the invention in which an exclusive property or privilege is claimed are as follows:

1. A process for the continuous manufacture of viscose comprising:
    (A) in a first kneading machine
       (1) pre-compressing continuously and mechanically alkali cellulose crumbs in advance of the initiation of an initial sulfiding reaction of the crumbs;
       (2) simultaneously supplying carbon disulfide and an aqueous alkali solution in a non-emulsified state to said compressed crumbs to keep said crumbs in their wetted and solid state, said volume of aqueous alkali solution being at least several times the volume of said carbon disulfide, whereby the crumbs are subjected to the combined action of swelling by the alkali, sulfiding by the carbon disulfide to form a xanthate and a partial dissolving of said xanthate by said alkali;
       (3) kneading said xanthate, non-reacted carbon disulfide, alkali solution and alkali cellulose completely together into a paste product;
    said kneading and said supplying being adjusted to consume less than 50% of said carbon disulfide while maintaining the reaction at 5–20° C.; and
    (B) transferring said paste from said first kneading machine to a second shearing type rotary kneader whereby the remaining and main sulfiding reaction is performed.

2. Process according to claim 1, characterized by that the formed paste in the first kneader is subjected to a throttling action for providing a back pressure transmitted through the paste per se to the crumb compression zone.

3. Process according to claim 1, characterized by that the paste is taken out from the first kneader through its outlet opening in the axial direction of the kneader.

4. Process according to claim 1, characterized by that the outlet paste from the first kneader is subjected to a pumping action at an intermediate point between the first kneader and the second kneader.

5. Process according to claim 1, characterized by that the relative ratio of the carbon disulfide and the aqueous alkali solution fed to the first kneader is from 1:5 to 1:20.

6. Process according to claim 1, characterized by that the reaction mixture in the first kneader is subjected therein to a quick push and slow-return movement for carrying out said pre-compression of the crumbs in its compression zone and for urging the reaction mixture towards the outlet opening of the kneader.

7. Process according to claim 1, characterized by that the carbon disulfide and the aqueous alkali solution are combined together at a point directly before introduction of these liquid reagents into the first kneader.

8. Process according to claim 1, characterized by that the carbon disulfide and the aqueous alkali solution are separately fed to the first kneader and combined together within the working space of the kneader at the crumb compression zone.

9. A process according to claim 1, characterized by that said reaction in said second kneader is carried into effect by subjecting the introduced paste to severe and repeated liquid shearing action caused by pin-to-pin relative motion.

10. A process according to claim 1, characterized by that said reaction in said second kneader is carried into effect without feed of alkali solution.

11. Process according to claim 1, characterized by that the outlet paste mainly comprising the xanthate is dissolved in an aqueous alkali solution in a third kneader of shearing type which is of similar design to said second kneader.

12. Process according to claim 1, characterized by that a possible explosion of a mixture of the carbon disulfide with air in the first kneader is prevented by dividing said disulfide into parts and enclosing these divided parts by the aqueous alkali solution.

13. Process according to claim 12, characterized by that said prevention of explosion is further assisted by feeding carbon disulfide and aqueous alkali solution to the alkali cellulose crumbs compressed in the crumb compression zone to such a quantity that the compressed crumbs are kept in its wetted state.

14. Process according to claim 12, characterized by that said prevention of explosion is further assisted by filling the main reaction space in said first kneader exclusively with the formed paste, thereby suppressing invasion of air into said reaction space.

15. Process according to claim 1, characterized by that the main sulfiding reaction is carried out at a temperature range between 3° C. and 15° C. effected by inside rotor cooling and outside jacket cooling.

16. Process according to claim 11, characterized by that the dissolution is carried out at a temperature range between 3° C. and 15° C. effected by inside rotor cooling and outside jacket cooling.

17. A process according to claim 1, characterized by that the outlet viscose delivered from the second kneader has a viscosity of from about 5000 to 50,000 poises.

18. Process according to claim 1, characterized by that the outlet viscose delivered from the second kneader has a high alkali content of at least 9%.

19. Process according to claim 1, characterized by that the outlet viscose delivered from the second kneader has a high cellulose content of at least 9%.

20. A process according to claim 1, characterized by that the amount of carbon disulfide consumed in the first kneading machine ranges from 30 to 40%.

References Cited

UNITED STATES PATENTS 2,985,647  5/1961  Kohorn _____________ 260—217

FOREIGN PATENTS 521,030  1/1956  Canada _____________ 260—217

THEODORE MORRIS, Primary Examiner

U.S. Cl. X.R.

260—217; 264—188